(12) United States Patent
Dubiel et al.

(10) Patent No.: US 12,303,997 B2
(45) Date of Patent: May 20, 2025

(54) DEVICE FOR SETTING A CONNECTING ELEMENT

(71) Applicant: EJOT SE & Co. KG, Bad Berleburg (DE)

(72) Inventors: Gerhard Dubiel, Tambach-Dietharz (DE); Angelique Wolff, Tambach-Dietharz (DE); Marco Werkmeister, Georgenthal / OT Schoenauv.d.W (DE); Tim Koeppchen, Georgenthal / OT Hohenkirchen (DE)

(73) Assignee: EJOT SE & Co. KG (DE)

( * ) Notice: Subject to any disclaimer, the term of this patent is extended or adjusted under 35 U.S.C. 154(b) by 0 days.

(21) Appl. No.: 17/920,370

(22) PCT Filed: Apr. 20, 2021

(86) PCT No.: PCT/EP2021/060275
§ 371 (c)(1),
(2) Date: Oct. 20, 2022

(87) PCT Pub. No.: WO2021/214083
PCT Pub. Date: Oct. 28, 2021

(65) Prior Publication Data
US 2023/0158600 A1    May 25, 2023

(30) Foreign Application Priority Data
Apr. 21, 2020   (DE) ..................... 10 2020 110 855.9

(51) Int. Cl.
*B23K 20/12*       (2006.01)
*B23P 19/00*       (2006.01)
(Continued)

(52) U.S. Cl.
CPC .......... *B23K 20/127* (2013.01); *B23K 20/129* (2013.01); *B23P 19/006* (2013.01); *B25B 23/08* (2013.01); *B25B 31/00* (2013.01)

(58) Field of Classification Search
None
See application file for complete search history.

(56) References Cited

U.S. PATENT DOCUMENTS 2,570,164 A    10/1951   Shaff
9,403,317 B2 *  8/2016   Zebisch ............... B23K 20/129
(Continued)

FOREIGN PATENT DOCUMENTS

DE    10 2006 013 529 A1    10/2006
DE    10 2015 202 074 A1    5/2015
(Continued)

*Primary Examiner* — Devang R Patel
(74) *Attorney, Agent, or Firm* — Frijouf, Rust & Pyle, P.A.

(57) ABSTRACT

The invention relates to a device (10) for setting a connecting element (100, 300) with a top-side drive structure (22, 44), comprising a feed device (12) for applying an axial force, a rotary spindle (14, 40, 68, 82, 140) and a drive bit (20, 42, 60, 70, 80, 142, 242) connected to same, which has drive structures (22, 44) arranged circumferentially and at the end in a setting direction (S) in order to interlockingly cause the connecting element (100, 300) to rotate, wherein the drive bit (20, 42, 60, 70, 80, 142, 242) has an axial through-opening, and the device also comprises a suction unit (18) with which air can be suctioned out at the end side of the drive bit (20, 42, 60, 70, 80, 142, 242).

16 Claims, 9 Drawing Sheets

(51) Int. Cl.
*B25B 23/08* (2006.01)
*B25B 31/00* (2006.01)

(56) References Cited

U.S. PATENT DOCUMENTS

| | | | |
|---|---|---|---|
| 9,463,514 | B2 | 10/2016 | Maiwald et al. |
| 10,160,068 | B2 | 12/2018 | Maiwald et al. |
| 10,710,193 | B2 | 7/2020 | Werkmeister et al. |
| 2006/0213954 | A1 | 9/2006 | Ruther et al. |
| 2018/0021883 | A1* | 1/2018 | Werkmeister ...... B23K 20/1255 |
| | | | 228/2.3 |
| 2021/0268569 | A1* | 9/2021 | Werkmeister ........ B23K 20/126 |

FOREIGN PATENT DOCUMENTS

| | | |
|---|---|---|
| DE | 10 2018 103 991 A1 | 2/2018 |
| DE | 10 2018 109 697 A1 | 4/2018 |
| EP | 2 632 629 B1 | 10/2018 |
| EP | 3 437 802 A1 | 2/2019 |

* cited by examiner

DEVICE FOR SETTING A CONNECTING ELEMENT

This patent application is the national phase entry of PCT/EP2021/060275, international application filing date Apr. 20, 2021, which claims the benefit and priority of and to German patent application no. 10 2020 110 855.9, filed Apr. 21, 2020.

PCT/EP2021/060275, international application filing date Apr. 20, 2021 and German patent application no. 10 2020 110 855.9, filed Apr. 21, 2021 are incorporated herein by reference hereto in their entireties.

BACKGROUND OF THE INVENTION

The invention relates to a device for setting a connecting element.

In a manner known per se, a device for setting a connecting element with a top-side drive structure comprises a feed device for applying an axial force. Via the feed device, a contact force is applied to a rotary spindle and a drive bit connected to the latter for moving them in the setting direction. In particular, in the device according to the invention, the force applied to the screw, and thus to the connecting element, is more than 1.5 kN. The drive bit has drive structures arranged circumferentially and at the end in a setting direction in order to interlockingly cause the connecting element to rotate. Furthermore, the drive bit has an axial through-opening which is used for suctioning in the connecting element into place.

EP 2 632 629 B1 for example discloses the use of negative pressure for holding connecting elements temporarily on the rotary spindle.

In connecting elements that have small drive structures and that are coated, material may be abraded from the coating and deposit on the drive structures, causing unevenness, as a result of which the drive of the connecting element and the drive structures on the drive bit will no longer engage reliably. In cases where the connecting element is held in place by negative pressure, this thus means that sufficient negative pressure will not be reliably achieved. For this reason, parts that lack the required high manufacturing quality cannot be processed and must be rejected or will cause a defect during processing.

DE 10 2018 103 991 A1 proposes detecting the position of the drive element in the setting device.

SUMMARY OF THE INVENTION

It is the object of the invention to provide a device for setting a connecting element, which enables its reliable retention on the drive bit of the device, which permits higher tolerances or surface non-uniformities in the processing of coated connecting elements and thus provides a higher degree of error free operation in industrial manufacturing equipment.

According to the invention, the device comprises an insert element that has a suction surface on its end side which comes to rest against the head of the connecting element and delimits a suction cross-section circumferentially, which insert element is designed in such a way that the suction surface can move relative to the drive bit in the axial direction.

Furthermore, the insert element is designed in such a way that a negative pressure can be transmitted from the side of the insert element facing away in the setting direction to the suction surface of the insert element, wherein, before the suctioning of a connecting element, the suction surface adopts a first end position which is spaced apart in the setting direction from the through-opening end-side edge region that is adjacent to the suction surface.

In this way, the connecting element can be reliably suctioned onto the insert element and thus onto the drive bit, even if there is unevenness in the coating of the connecting element, particularly in the drive structures.

This ensures reliable retention of the connecting element because the suction surface will only come into contact with an unstructured area of the connecting element adjacent to the connecting element drive structures. Generally, the unstructured areas of the connecting element only exhibit minor to no unevenness caused by the coating.

Subsequently, the suction surface can then be moved axially relative to the drive bit so as to cause the drive structures to fully engage the connecting element. This is done in particular when the connecting element is placed on the component, preferably by applying a contact pressure to the suction surface in an axial direction opposite to the setting direction.

This reliably holds the connecting element is in place on the insert element until after the connecting element is placed on a top component layer, after which the connecting element can be inserted into the component by rotating it and exerting an axial force on it.

The suction pressure with which the connecting element is suctioned onto the insert element, and thus onto the drive bit, is in particular at least 0.3 bar. This preferably results in a negative pressure of between −0.3 bar and −0.85 bar.

Preferably, the drive bit can have a surface, in particular a flat surface, for transmitting the axial force required for performing the friction element welding process to the connecting element. As an alternative, the axial force can also be applied via the insert element.

In another embodiment of the invention, the drive structure may be a drive for an external drive, in which case the suction surface is located radially inside the drive structures.

As an alternative, the end-side drive structure of the drive bit may be a drive structure for an internal drive, in which case the suction surface is adjacent to or outside the drive structure.

Preferably, the insert element may comprise a sleeve which is held so as to be movable in an axial direction relative to the drive bit. The sleeve has a first contact surface, while the drive bit has a second contact surface. The second contact surface is designed to correspond to the first contact surface in such a way that, when the suction surface is in a predefined end position with respect to the drive bit, in particular projecting slightly in the setting direction, the contact surfaces interact in a sealing manner in such a way that a negative pressure can be transmitted through the sleeve.

This can preferably be implemented in that the contact surface on the sleeve is designed as a collar and the contact surface on the drive bit is designed as a shoulder, with the collar and shoulder extending transversely to the setting direction. This, on the one hand, allows a sealing arrangement to be created in that the contact surfaces of collar and shoulder rest against one another, and on the other hand, a stop can be provided between collar and shoulder which limits axial movement between sleeve and drive bit in the selling direction and thus provides a defined end position.

Preferably, the insert element can be designed in such a way that a spring preload in the setting direction presses the sleeve against the shoulder in the drive bit. In this way, the contact surfaces of collar and shoulder are actively pressed against each other, resulting in an improved sealing effect. In addition, such an arrangement ensures that, due to the spring preload of the sleeve for the suction process, the suction surface is reliably held in the defined end position relative to the drive bit, even if, for example, the setting direction is opposite to the direction of the gravitational force.

This allows the radial clearance of the sleeve relative to the drive bit to be made larger, which in turn improves the reliability of axial movement, as sufficient sealing is reliably achieved at the contact surface between collar and shoulder in an axial direction.

The spring preload is preferably generated by a spring arrangement, which spring arrangement comprises at least one spring that is supported on a spring seat which is arranged in a stationary manner with respect to the drive bit.

In particular, the spring arrangement may comprise a disk spring assembly or a spiral spring.

The spring seat may be provided by the rotary spindle, with the drive bit being screwed to the rotary spindle.

The spring seat can also be provided by an insert sleeve which is inserted in a fixed position in the drive bit by means of an interference fit, for example. The insert sleeve can also be connected to the drive bit by a transition fit, in particular an H7/m6 fit.

Preferably, the drive bit and the insert sleeve are matched to one another in such a way that the friction spindle connected to the drive bit supports the insert sleeve during the joining process, with the insert sleeve being supported against a shoulder in the drive bit in the setting direction. This permits a plug connection from the drive bit to the friction spindle, which allows replacement of the spring-loaded sleeve in the drive bit as an assembly, while the process forces are still transmitted from the spindle to the drive bit.

The preload is preferably selected such that the contact pressure from shoulder to collar will be sufficient to achieve the contact pressure for the required negative pressure, but that it will always be smaller than the smallest axial force occurring during the joining process. This is regularly achieved using a force of less than 1 kN, in particular a force of between 5 N and 100 N, to ensure that the drive bit will transmit the axial process forces.

The insert element with its sleeve are matched to the drive bit in such a way that the drive bit, which has a contact surface for transmitting the process force, will transmit more than 90% of the process force via the contact surface of the drive bit during the setting process.

In another preferred embodiment of the invention, the sleeve may have a stop located opposite to the setting direction, which stop comes into contact with the rotary spindle and/or the insert sleeve.

This allows the process force to be transferred in full or in part to the suction surface of the sleeve. The suction surface thus also serves as a pressure surface for transferring the process forces in full or in part required for the joining process.

The drive bit and the length of the sleeve, and the extent of the axial displacement of the sleeve, are matched to one another in such a way that, when the sleeve is in the stop position opposite to the setting direction, the drive structures of a connecting element and the drive structures of the drive bit will interlock and engage each other, but the axial process forces will be transmitted via the sleeve.

The stop lying opposite to the setting direction can be designed as a sleeve section, which is designed to have a larger diameter than the end-face diameter on the suction surface, with the transition from the larger to the smaller diameter being stepped, thus forming a shoulder. In particular, a spring is inserted inside the sleeve section with the larger diameter, which sleeve is supported against the shoulder in the setting direction and against the spring seat element in the direction opposite to the setting direction.

In yet another embodiment of the invention, the stop lying opposite the setting direction may be designed as a sleeve section having the same diameter as the end-face diameter. On the sleeve, a collar is provided which extends around the sleeve and on which the spring is supported, with the sleeve preferably passing through the spring.

A particularly preferred embodiment of the invention may provide for the contact surface lying opposite the setting direction to be of a perforated design, since the sleeve has radial recesses at the sleeve end facing the spring seat element. This ensures that dirt entering into the insert element will not settle on the stop surface. This also ensures that the coordination of sleeve length and extent of axial travel will not be impaired.

Additional advantages, features and possible applications of the present invention may be gathered from the following description in which reference is made to the embodiments illustrated in the drawings.

BRIEF DESCRIPTION OF THE DRAWINGS

In the drawings,

FIG. 9c is a sectional view taken along line C-C of FIG. 9a.

DESCRIPTION OF THE INVENTION

Figure 1:
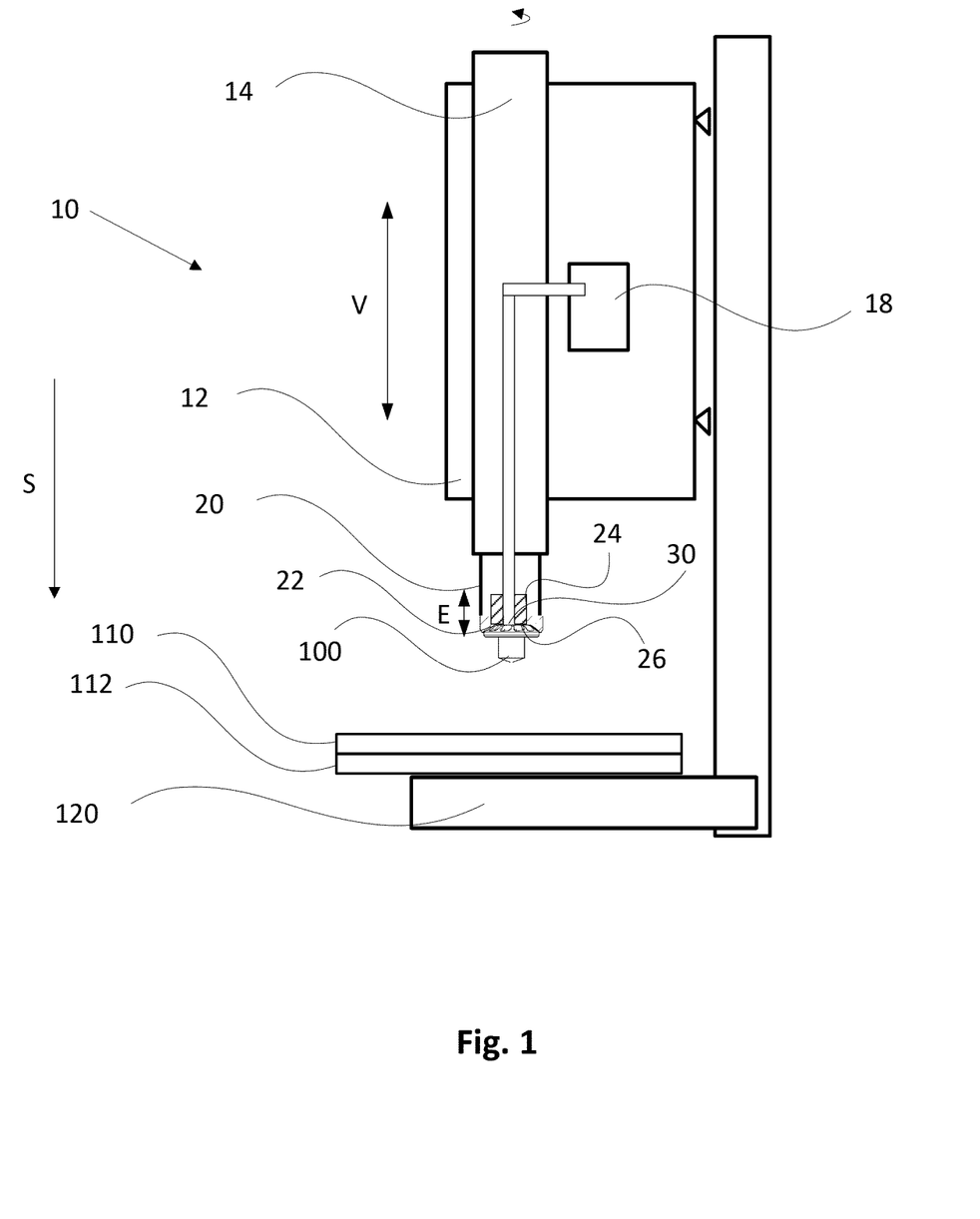
FIG. 1 is a sectional view of a first embodiment according to the invention.

FIG. 1 is a schematic view of a device 10 according to the invention for setting a connecting element 100 with a top-side drive structure 22, comprising a feed device 12 for applying an axial force, a rotary spindle 14 and a drive bit 20 connected thereto, which has drive structures 22 arranged circumferentially and at the end in a setting direction S in order to interlockingly cause the connecting element 100 to rotate. Furthermore, the device 10 comprises a suction unit 18 with which air can be suctioned out at the end side of the drive bit 20. This makes it possible to suction a connecting element 100 onto the end side of the drive bit 20. Once the connecting element 100 has been suctioned into contact, it is moved downwards in the setting direction S and is introduced into the component assembly 110, 112 by rotation of the rotary spindle 14 and under contact pressure generated by the feed device 12, with the result that in particular the top component layer is penetrated by the connecting element 100, and further the connecting element 100 is friction-welded to the bottom component layer 112 by means of the frictional energy introduced. In the case illustrated here, the feed device 12 is moved with respect to a counterhold 120, with component layers 110 and 112 resting on said counterhold 120 during the joining process. Usually, a hold-down device may also be provided for clamping the component layers 110, 112 in place, which hold-down device is not explicitly shown in this case.

According to the invention, an insert element 24 is provided which has a suction surface 26 on its end face, which circumferentially delimits a suction cross-section 30, with said insert element 24 being configured such that the suction surface 26 can be moved in the axial direction relative to the drive bit 20.

Negative pressure is transmitted from the side of the insert element 24 facing away in the setting direction S to the suction surface 26 of the insert element 24, which suction surface 26 adopts a first end position which is spaced apart from the end-side edge region of the through-opening in the setting direction S before a connecting element 100 is being suctioned into contact. During the setting process, the insert element 24 is displaced by an extent E into a second position that is spaced apart from the first position in a direction opposite to the setting direction S.

Different variants of the drive bit 20 in different embodiments of the insert element 24 will now be described with reference to FIGS. 2 to 9c.

Figure 2A:
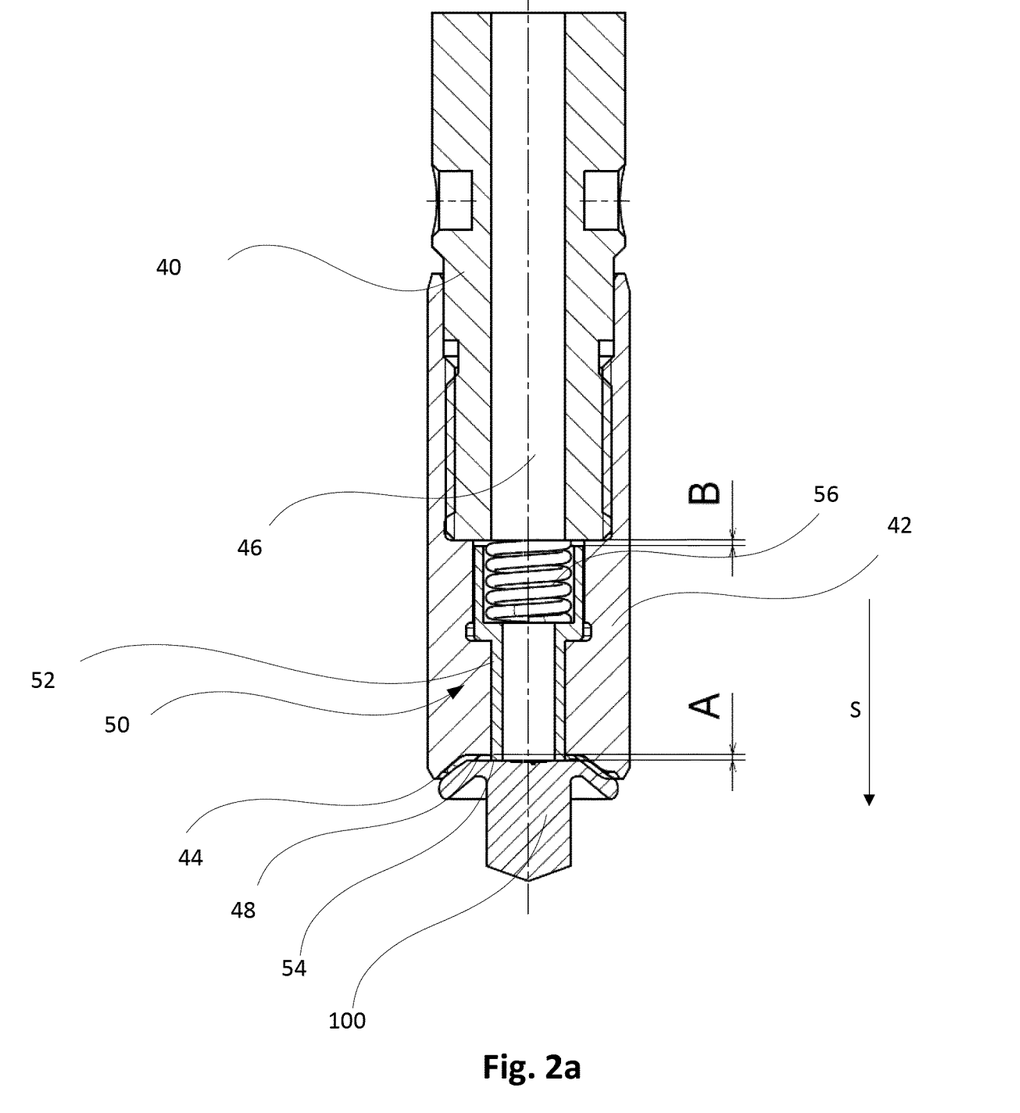
FIG. 2a is a sectional view taken at the drive bit.

FIG. 2a is a sectional view taken at the drive bit 42 of a first embodiment of a setting device according to the invention.

The setting device includes the rotary spindle 40, which rotates a connecting element 100 and which is used to impart the contact pressure required for making the connection.

In the present embodiment, a drive bit 42 is screwed onto the rotary spindle 40. The drive bit 42 and the rotary spindle 40 are provided with a central duct 46, via which a suction effect can be generated at the front end of the drive bit 42 by means of a suction unit 18, for example a suction pump or a Venturi nozzle.

An insert element 50 is inserted into the drive bit 42, which comprises a sleeve 52 that has an annular suction surface 54 on its end face and which conveys the suction pressure to a connecting element 100 resting against the suction surface 54. The insert element 50 further comprises a spring 56, in particular a spiral spring, which is arranged between rotary spindle 40 and sleeve 52 in such a manner that sleeve 52 is preloaded in the setting direction S.

The sleeve 52 and the recess in the drive bit 42 are matched to one another in such a way that the sleeve 52 is mounted so as to be movable in the axial direction, but a first stop is formed which sets the maximum length A by which the sleeve 52 projects beyond the pressure surface 48.

The fact that there is a projection length A in a suction position makes for good contact of the suction surface 54 with the head surface of the connecting element 100, as any skewing of the connecting element 100 due to coating buildup in the drive structures 22 of the connecting element 100 is avoided.

Furthermore, the end of sleeve 52 lying opposite the setting direction S is aligned with drive bit 42 and rotary spindle 40 in such a way that sleeve 52 will abut against rotary spindle 40 when the suction surface 54 is at the level of the pressing surface 48 of drive bit 42.

The stop is designed in such a way that the distance B in the suctioning position is at least as large as the projection length A. This ensures that substantial parts of the contact pressure are transmitted to the connecting element 100 via the drive bit 42.

If distance B is equal to projection length A, contact pressure transmission can also be partially effected from the rotary spindle 40 to the connecting element 100 via the sleeve 52.

Figure 2B:
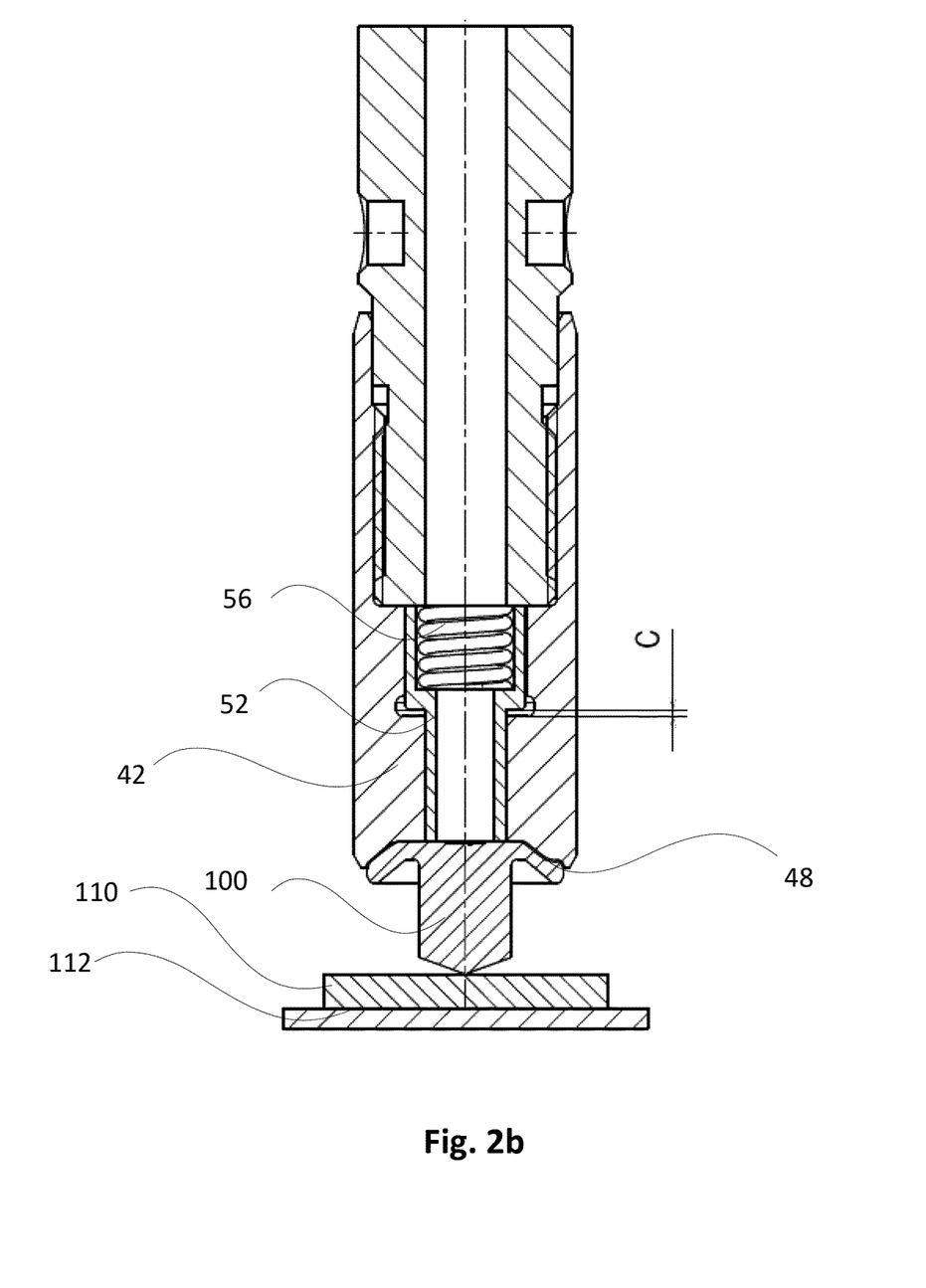
FIG. 2b is a sectional view similar to that of FIG. 2a, in which the connecting element is pressed against a component layer.

FIG. 2b illustrates the arrangement according to the invention of FIG. 2a when the connecting element 100 is being pressed against a component layer 110, 112. In this situation, sleeve 52 is displaced against the spring force of spring 56 until the suction surface of sleeve 52 is flush with the pressure surface 48 of drive bit 42. If the pressing force is not to be transmitted via sleeve 52, sleeve 52 and the recess in drive bit 42 are matched in such a way that sleeve 52 will not abut against the rotary spindle in the pressed-on state.

Otherwise, in a coordinated arrangement in which sleeve 52 abuts against rotary spindle 40 when the suction surface 54 of sleeve 52 is flush with the pressure surface 48 of drive bit 42, the pressure force can also be transmitted partially via the suction surface so that overall, a larger force transmission surface is available. This reduces the creation of impressions on the head of the connecting element 100, which in particular preserves the coating of the element provided for corrosion prevention. In this case, the advance amount C corresponds to the projection length A.

Figure 3A:
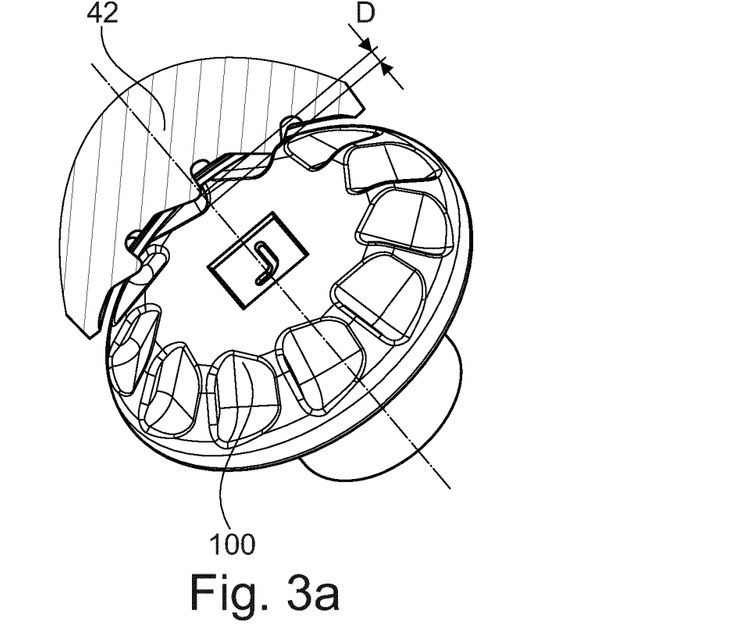
FIG. 3a is a sectional view of the drive bit through the drive structure in the suctioning position.

FIG. 3a is a sectional view of the drive bit through the drive structure in the position where it is suctioned into contact. From this illustration, it can be clearly seen that there is a distinct distance D between the drive structures of drive bit 42 and the drive structures of connecting element 100, so that any excess coating deposited on the drive structures will not affect the position of the connecting element 100 in relation to the drive bit 42.

Figure 3B:
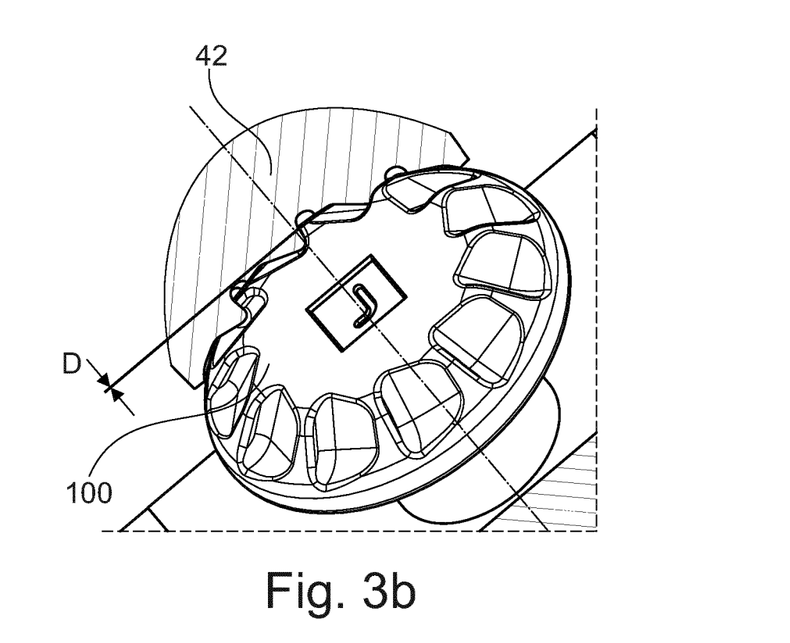
FIG. 3b is a detail according to FIG. 3a in a working position according to FIG. 2b.

FIG. 3b is a detail of FIG. 3a in a working position according to FIG. 2b. It can be clearly seen in this view that, in the working position, the drive structures of drive bit 42 and the drive structures of connecting element 100 interlock and engage each other. The distance D is significantly smaller here than in FIG. 3a.

Figure 4:
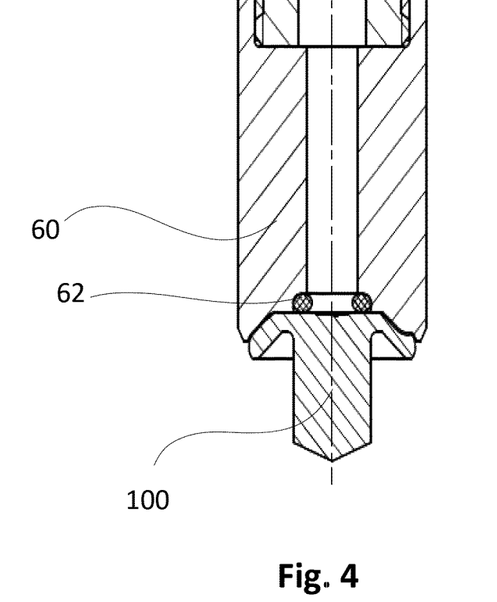
FIG. 4 is a view of another embodiment according to the invention.

FIG. 4 is a view of a yet another embodiment of the invention, in which the insert element is configured as a circumferentially closed element that is elastic in an axial direction, in particular is designed as an O-ring 62, which elastic element is inserted into the drive bit 60 on the end face.

The elasticity and the element cross-section of the elastic element are matched to one another in such a way that, in the case of an extended cross-section, the suction surface will be spaced a defined distance in the setting direction from the pressure surface of drive bit 60, and that, when the connecting element 100 is pressed into contact by the process force, the insert element will be compressed in such a way that the pressure surface of drive bit 60 will bear against the head of connecting element 100, and the insert element will be at the same level as the pressure surface of drive bit 60.

The defined distance is selected in such a way that the drive structures of drive bit 60 and of connecting element 100 just barely will not interlock, as is also shown in FIGS. 3*a*, 3*b*.

The elastic element preferably has a Shore hardness of between 50 and 120 Shore A.

This embodiment has the advantage that the insert element does not have to comprise any moving parts, but axial displacement of the suction surface is achieved exclusively via the elastic deformation of the insert element.

Figure 5:
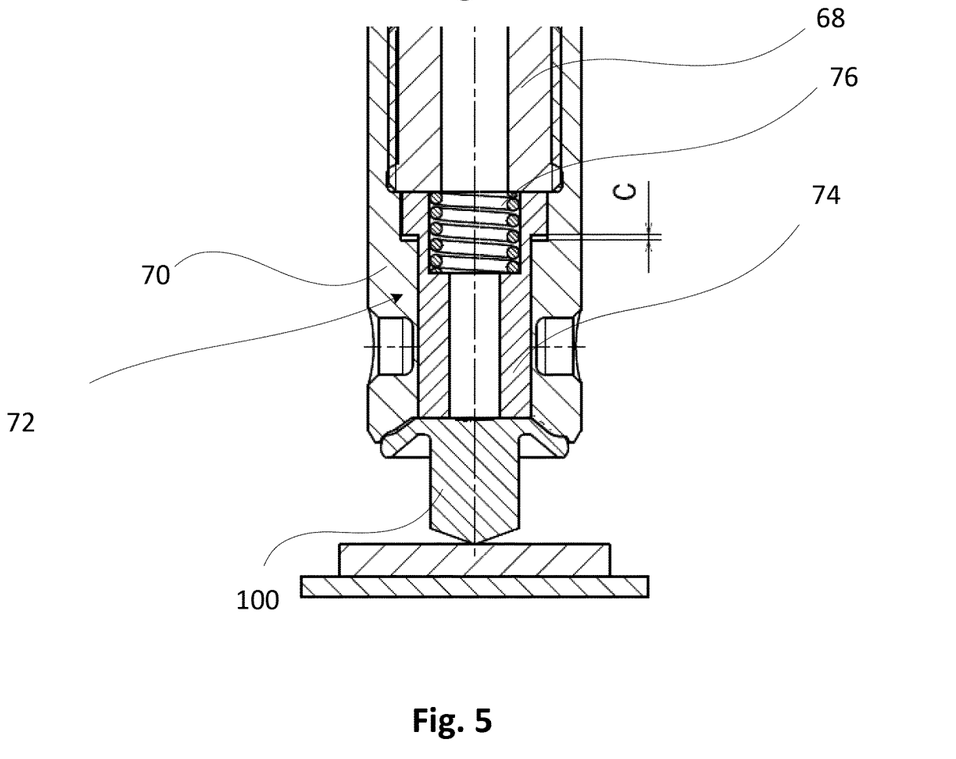
FIG. 5 is a sectional view of another embodiment according to the invention.

FIG. 5 is a sectional view of another embodiment of the invention, in which drive bit 70 has been screwed in place on rotary spindle 68. An insert element 72, which comprises a sleeve 74 and a spiral spring 76, is inserted into the drive bit 70 so that it can move axially. The design with regard to the axial stops essentially corresponds to the design illustrated in FIG. 2. In contrast to FIG. 2, the width of suction surface 26, which is designed as an annular surface, is selected to be significantly larger, so that the process forces are essentially transmitted to connecting element 100 via insert element 72, i.e. in particular via sleeve 74. The length of the sleeve and the distance of the head contact area on drive bit 70 are of equal length in this case. As already described with regard to FIG. 2, spiral spring 76 ensures axial positioning of sleeve 74 in the suctioning position, when sleeve 74 is not loaded from the outside.

Figure 6:
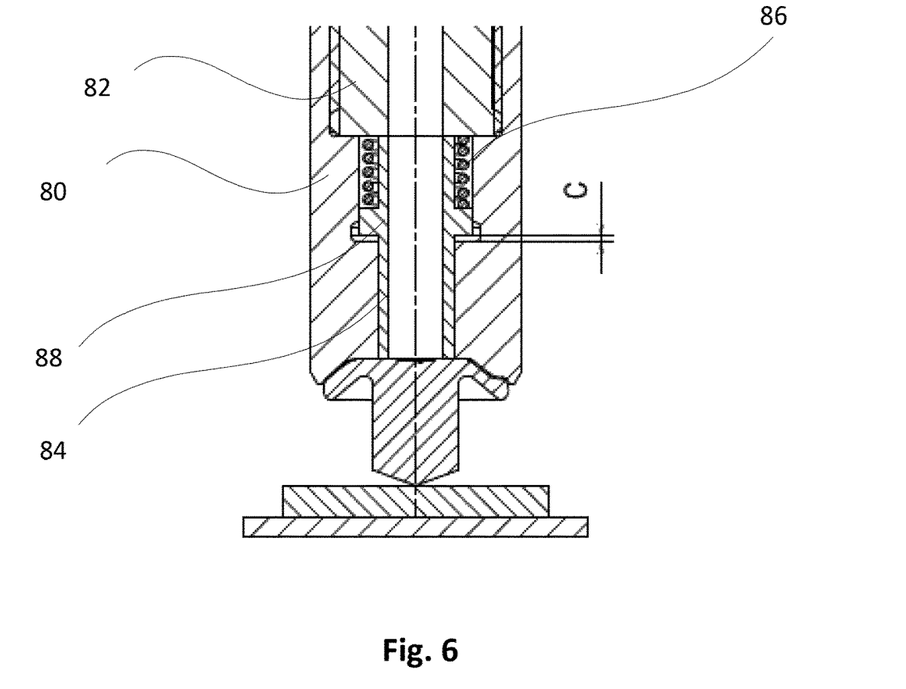
FIG. 6 is a sectional view of yet another embodiment, a sleeve.

FIG. 6 is a view of another embodiment of a sleeve 84, which has its stop on rotary spindle 82 in the form of a continuous sleeve 84 that has a collar 88 which extends radially outward. A spring 86 lies over the upper end of sleeve 84 and is supported on rotary spindle 82 and on collar 88. On its side facing away from the spring, collar 88 forms the stop surface on drive bit 80, which determines the projection length C in the suctioning state.

Figure 7:
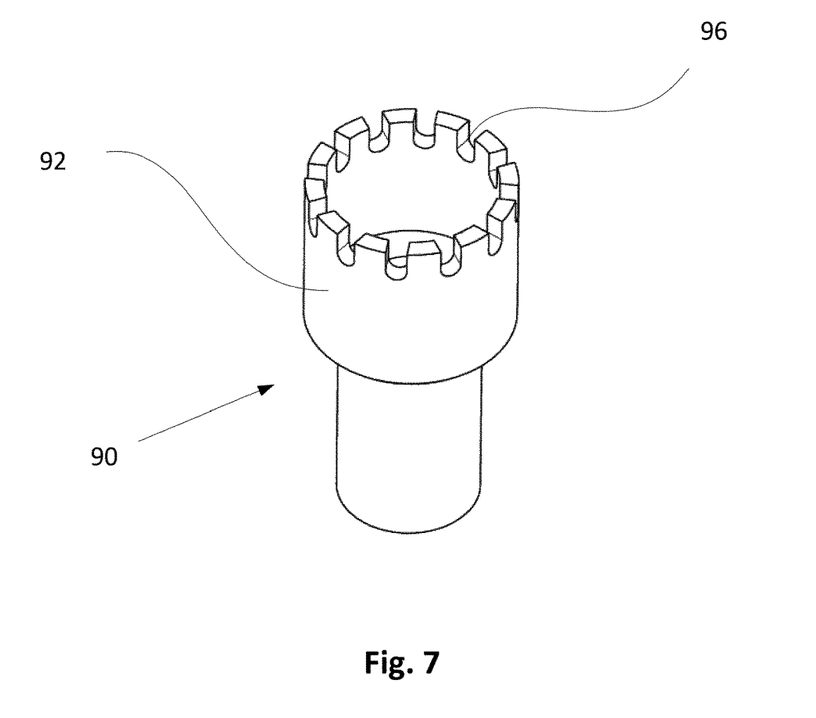
FIG. 7 is a sectional view of yet another embodiment, a sleeve.

FIG. 7 is a view of a particularly preferred design of a sleeve 90 that can be used in one of the Figures described above with slight modifications, namely in that the sleeve end 92 facing the rotary spindle has recesses 96, in particular, circumferential recesses 96. As a result, dirt suctioned in by the sleeve due to the suction effect, will not be deposited between sleeve 90 and the friction spindle, but will be able to enter the intermediate spaces formed by recesses 96. This largely prevents an accumulation of dirt between sleeve 90 and rotary spindle from causing a displacement of the position of the stop in an axial direction.

Figure 8:
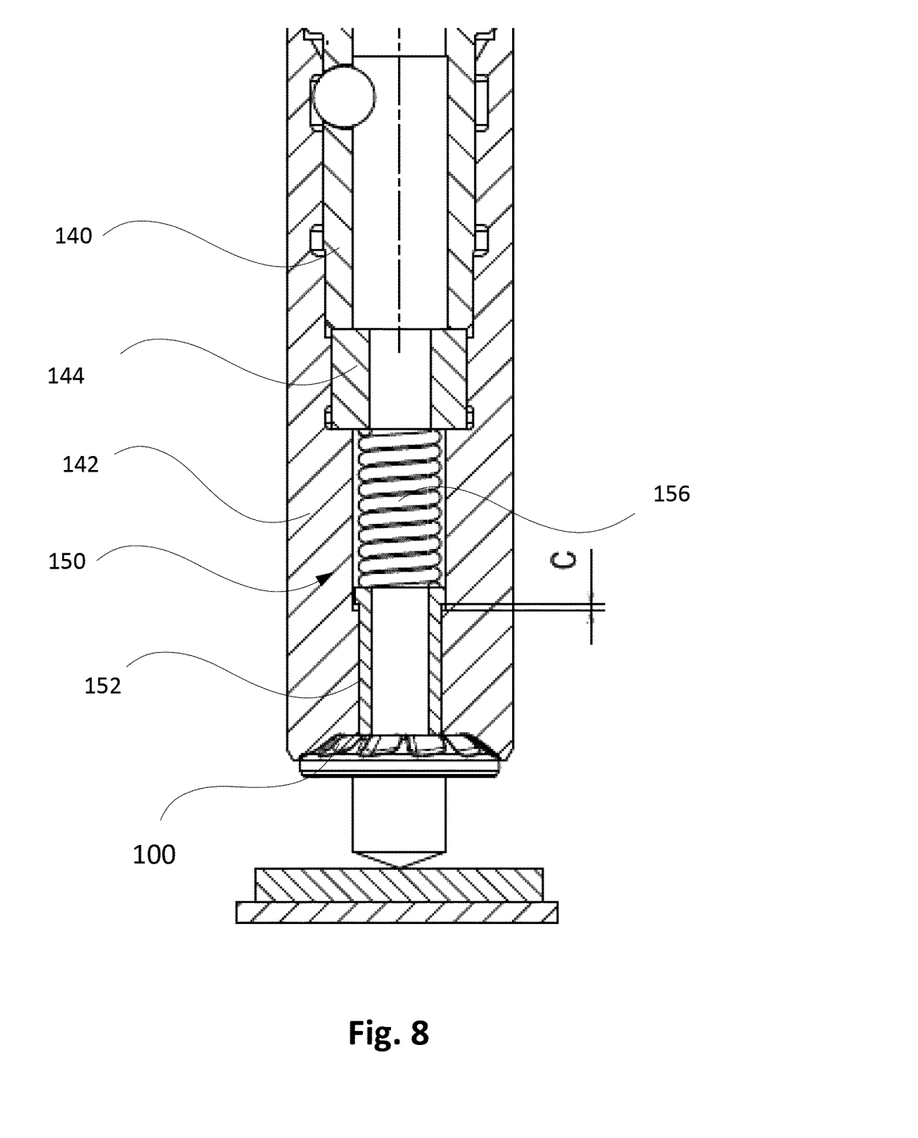
FIG. 8 is a sectional view of another embodiment of the drive hit according to the invention.

FIG. 8 is a view of another embodiment of the invention which differs from the examples described above in two aspects, namely that, firstly, sleeve 152 exerts a stop exclusively against spring 156, and, secondly, that drive bit 142 has a stop surface 144 for insert element 150, so that drive bit 142 and insert element 150 can be mounted and dismounted together as an assembly on the rotary spindle 140.

Preferably, the stop surface is the front-end surface of a thrust piece 144 which is pressed into drive bit 142, in particular in a transition fit. Drive bit 142 additionally has latching means which can be connected to latching means of rotary spindle 140 in such a way that a rotary movement can be transmitted and the front end of rotary spindle 140 will bear against thrust piece 144. Preferably, thrust piece 144 rests against a shoulder of drive bit 142 in the setting direction. This makes it possible to transmit the process force to drive bit 142 in a form-fitting manner.

In this manner, a quick-release means is created that allows easy replacement of the insert elements 150 in the event of wear or damage.

Spring 156 may be dimensioned such that when the suction surface is level with drive bit 142, sleeve 152 will be fully compressed against either spring 156, thereby partially transmitting process forces to connecting element 100 via sleeve 152, or the spring will not yet be fully compressed, so that only the spring force will act on connecting element 100 via sleeve 152.

The design of insert element 156 can be combined as desired with the other designs of insert element 150 described herein.

Figure 9A:
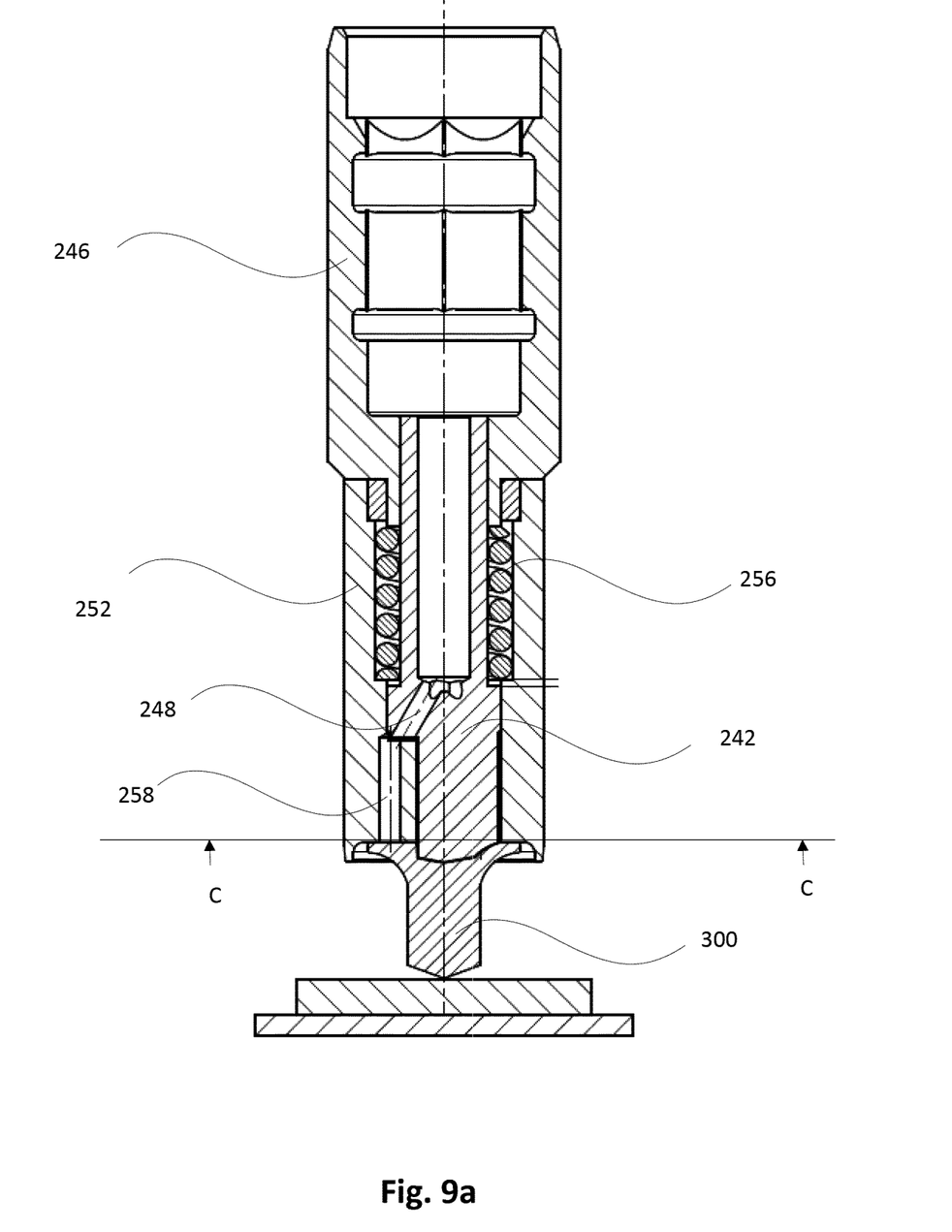
FIG. 9a is a sectional view of another [ . . . ] for processing a connecting element with an internal drive.

FIG. 9*a* is a view of another alternative embodiment in which a connecting element 300 is processed with an internal drive. In this connecting element, the pressure area and the suction area are provided externally of the internal drive, with the process force being imparted via sleeve 252. Accordingly, sleeve 252 abuts on a rotary spindle receiving member 246 when drive bit 242 is fully engaged with the drive of connecting element 300. As has also been described previously, the projection in the suction position is provided by a spring 256, which is in particular a spiral spring.

A plurality of suction channels 248 are formed in drive bit 242, each of which merges with suction ducts 258 formed in sleeve 252. This makes it possible to suction connecting element 300 into place.

Figure 9B:
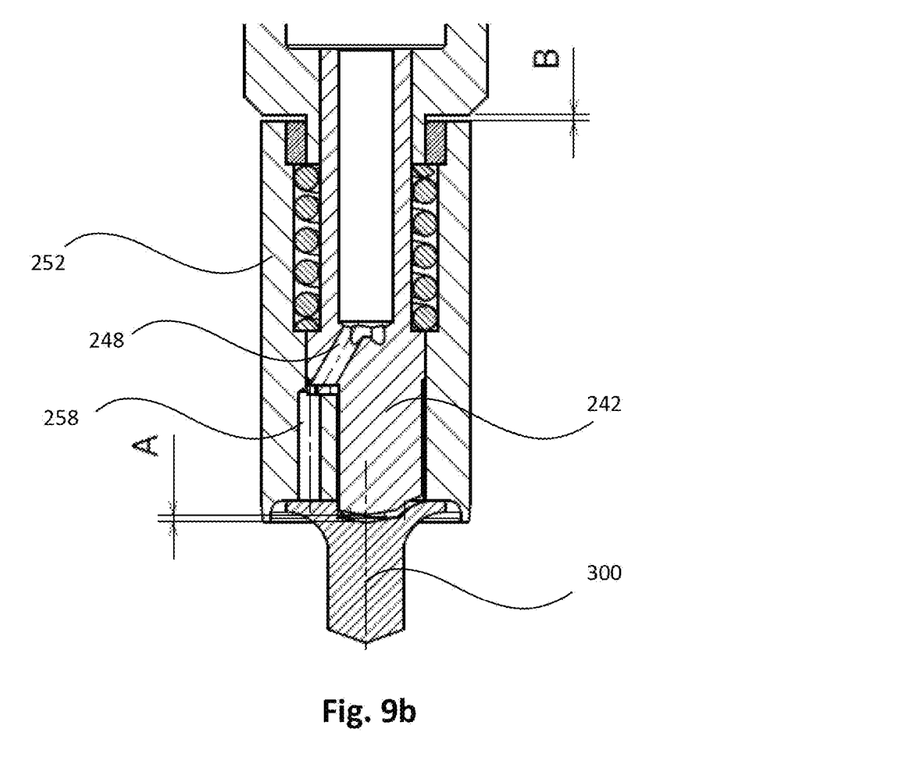
FIG. 9b is a view of a corresponding projection in the setting direction of the sleeve with respect to the drive bit.
Figure 9C:
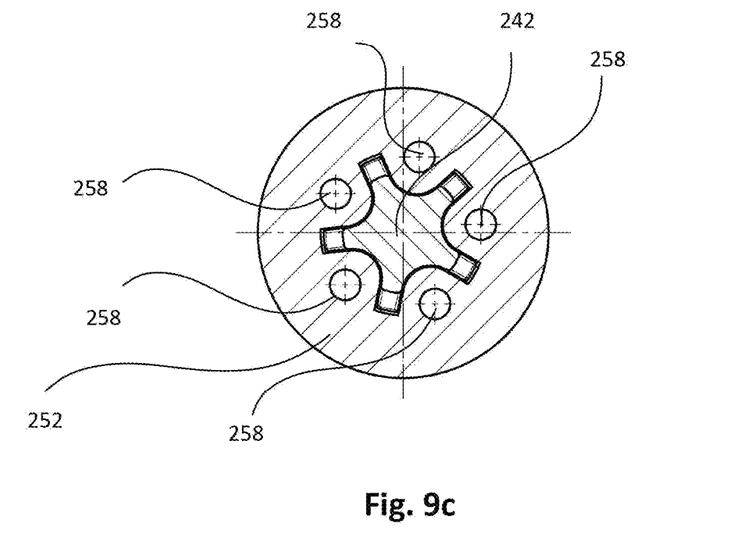

The sectional view is illustrated in more detail in FIG. 9*c*.

FIG. 9*b* shows the corresponding projection A in the setting direction of sleeve 252 relative to drive bit 242. In this way, the internal drive of connecting element 300 is not yet fully engaged when the connecting element has been suctioned into place.

FIG. 9*c* is a sectional view taken along line C-C of FIG. 9*a*. Here, suction ducts 258 of sleeve 252 are distributed along a circular ring on the pressing surface of sleeve 252. Drive bit 242 is disposed centrally within sleeve 252 which is adapted to be movable axially relative to drive bit 242.

The invention claimed is:

1. Device (10) for setting a connecting element (100, 300) having a top-side drive structure (22, 44), comprising a feed device (12) for applying an axial force, a rotary spindle (14, 40, 68, 82, 140) and a drive bit (20, 42, 60, 70, 80, 142, 242) connected to same, which has drive structures (22, 44) arranged circumferentially and at the end in a setting direction (S) in order to interlockingly cause the connecting element (100, 300) to rotate, wherein the drive bit (20, 42, 60, 70, 80, 142, 242) has an axial through-opening, which device further comprises a suction unit (18) with which air can be suctioned out at the end side of the drive bit (20, 42, 60, 70, 80, 142, 242), characterized in that an insert element (24, 50, 72, 150) is provided which has a suction surface (26, 54) on the end side, which circumferentially delimits a suction cross-section (30), said insert element (24, 50, 72, 150) being designed in such a way that the suction surface (26, 54) can move relative to the drive bit (20, 42, 60, 70, 80, 142, 242) in the axial direction, and a negative pressure can be transmitted from the side of the insert element (24, 50, 72, 150) facing away in the setting direction (S) to the suction surface (26, 54) of the insert element (24, 50, 72, 150), wherein, before the suctioning of a connecting element (100, 300), the suction surface (26, 54) adopts a first end position which is spaced apart from the end-side edge region of the through-opening in the setting direction (S) and adopts a second position, shifted opposite the setting direction (S), during the setting process.

2. Device according to claim 1, characterized in that the insert member (24, 50, 72, 150) comprises a sleeve (52, 74, 84, 90, 152, 252) having a first contact surface, and the drive bit (42, 70, 80, 142, 242) has a second contact surface, the second contact surface being designed to correspond to the first contact surface in such a way that, in a predefined end position of the suction surface with respect to the drive bit (42, 70, 80, 142, 242), the contact surfaces interact in a sealing manner in such a way that a negative pressure can be transmitted through the sleeve (52, 74, 84, 90, 152, 252).

3. Device according to claim 2, characterized in that the contact surface on the sleeve (52, 74, 84, 90, 152, 252) is designed as a collar and the contact surface on the drive bit (42, 70, 80, 142, 242) is designed as a shoulder, with the collar and shoulder extending transversely to the setting direction.

4. Device according to claim 3, characterized in that the sleeve (52, 74, 84, 90, 152, 252) is pressed in the setting direction against the shoulder in the drive bit (42, 70, 80, 142, 242) against a spring preload.

5. Device according to claim 1, characterized in that the end position is spaced at a distance of between 0.1 mm and 4 mm from the front end of the drive bit.

6. Device according to claim 1, characterized in that the spring preload is generated by at least one spring (56, 86, 156, 256), which is supported indirectly against a spring support element (42, 70, 80, 144, 246) lying stationary relative to the drive bit or directly against the drive bit.

7. Device according to claim 6, characterized in that the spring is an elastic element, which is in particular a rubber element, which is in particular an O-ring.

8. Device according to claim 6, characterized in that the spring seat element is formed by a rotary spindle (14, 40, 68, 82) screwed into the drive bit (42, 60, 70, 80).

9. Device according to claim 1, characterized in that the spring seat element is provided by an insert sleeve (144) fixedly inserted into the drive bit (142).

10. Device according to claim 9, characterized in that the insert sleeve (144) serves as an abutment for the rotary spindle, with the insert sleeve (144) bearing against a shoulder in the drive bit (142) in the setting direction.

11. Device according to claim 1, characterized in that the spring preload exerts a force of between 5 N and 100 N on the sleeve (52, 74, 84, 90, 152, 252).

12. Device according to claim 1, characterized in that the sleeve (52, 74, 84, 90, 152, 252) has an inner diameter of between 1.0 mm and 10 mm with a wall thickness of between 0.5 mm and 5 mm.

13. Device according to claim 1, characterized in that the sleeve (52, 74, 84, 90, 252) has a stop facing away from the setting direction which comes into contact with the rotary spindle (14, 40, 82 140) or an insert sleeve (144), whereby the process force is transmitted in full or in part to the front end of the sleeve.

14. Device according to claim 13, characterized in that the stop is designed as a sleeve section having a larger diameter than the front-side diameter and the spring (56, 76) is located within the sleeve (52, 74).

15. Device according to claim 13, characterized in that the stop is designed as a sleeve section having the same diameter as the end-side diameter and the spring (86) rests against a collar surrounding the sleeve (84).

16. Device according to claim 14, characterized in that the stop surface (92) is of a discontinuous design, i.e. it has at least one shoulder (96) in which dirt collects.

\* \* \* \* \*